United States Patent
Farchi et al.

(10) Patent No.: US 7,661,099 B2
(45) Date of Patent: Feb. 9, 2010

(54) USING IDEMPOTENT OPERATIONS TO IMPROVE TRANSACTION PERFORMANCE

(75) Inventors: Eitan Farchi, Pardes Hanna-Carcur (IL); Shachar Fienblit, Ein Ayala (IL); Amiram Hayardeny, Binyamina (IL); Rivka Matosevich, Zichron Ya'akov (IL); Ifat Nuriel, Beit Yosef (IL); Sheli Rahav, Haifa (IL); Dalit Tzafrir, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 976 days.

(21) Appl. No.: 10/879,871

(22) Filed: Jun. 29, 2004

(65) Prior Publication Data

US 2005/0289548 A1    Dec. 29, 2005

(51) Int. Cl.
*G06F 9/45*    (2006.01)
(52) U.S. Cl. .................................................. 717/156
(58) Field of Classification Search ................. 717/140, 717/146, 149, 159, 151–152, 9, 155, 156–157; 712/E9.017
See application file for complete search history.

(56) References Cited

U.S. PATENT DOCUMENTS

| 5,999,736 | A | * | 12/1999 | Gupta et al. | ................. 717/158 |
| 6,289,507 | B1 | * | 9/2001 | Tanaka et al. | ................. 717/155 |
| 2004/0139429 | A1 | * | 7/2004 | Ronen et al. | ................. 717/159 |

OTHER PUBLICATIONS

Xie et al., Using Redundancies to Find Errors, Nov. 2002, SIGSOFT 2002/FSE-10, p. 1-10.*
Hilderink et al, "Conditional Communication in the Presence of Priority", IOS Press 2000, pp. 77-98.*

* cited by examiner

*Primary Examiner*—Tuan Anh Vu (57) ABSTRACT

A method for optimizing a transaction consisting of an initial sequence of computer operations, the method including identifying one or more idempotent operations in the initial sequence. The method further includes reordering the initial sequence to form a reordered sequence consisting of a first sub-sequence of the computer operations followed by a second sub-sequence of the computer operations. The second sub-sequence has only the one or more idempotent operations.

2 Claims, 7 Drawing Sheets

USING IDEMPOTENT OPERATIONS TO IMPROVE TRANSACTION PERFORMANCE

FIELD OF THE INVENTION

The present invention relates generally to computer transaction processing, and specifically to management of the processing.

BACKGROUND OF THE INVENTION

A transaction is assumed to be a sequence of one or more computer operations, also herein termed computer steps, performed by a computing system, which change a state of the system. Methods for processing transactions, and in particular for recovering "gracefully" from a failure in such processing, are very well known in the art. *Transaction Processing: Concepts and Techniques*, by Gray and Reuter, published by Morgan Kaufmann Publishers, San Mateo Calif. (1993), describes transactions and their processing in detail, and sections 1.2 and chapter 10, respectively entitled "What Is a Transaction Processing System," and "Transaction Manager Concepts," are incorporated herein by reference.

As stated in the above-referenced section 1.2, a transaction has the properties of Atomicity, Consistency, Isolation, and Durability (ACID). The properties are described in section 1.2, and may be summarized as follows:

Atomicity Either all operations happen or none happen.

Consistency The transaction must result in a correct transformation of the state. The transaction must be a "correct program."

Isolation Even though transactions execute concurrently, it appears to each transaction, T, that others executed either before T or after T.

Durability Once a transaction completes successfully (commits), its changes to the state survive failures.

A transaction manager, which may comprise one or more sub-managers, depending on the computing system in which the transaction is being executed, monitors the progress of the transaction. By monitoring the transaction, the manager ensures that the ACID properties are complied with and also enables the possibility of a graceful recovery if a failure occurs during the transaction process. To perform the required monitoring, transaction managers known in the art save information concerning the computing system at various points of the transaction, such as at the beginning of the transaction, and at save points during the transaction. The save points are typically specified by a transaction protocol under which the transaction is processed.

The size of the information saved varies according to the protocol, and in protocols known in the art the size is of the order of the total size of variables involved in the transaction, or of the number of computer operations of the transaction. Chapter 10 of *Transaction Processing: Concepts and Techniques* describes a "DO-UNDO-REDO" protocol, in which information termed a transaction log is stored during the transaction process (the "DO" phase). The transaction manager can UNDO the transaction—typically necessary if it is determined that one of the ACID properties has not been complied with—by undoing each of the logged individual actions in a reverse order from the most recently logged action. The transaction manager can REDO the transaction—typically to recover from a system failure—by redoing logged actions in a forward direction.

Computer operations and processes may be classified as idempotent or non-idempotent. An operation is idempotent if performing the operation more than one time gives the same result as performing the operation once; conversely, an operation is non-idempotent if repeating the operation gives a different result. Thus, the operation "set my account to be $1,000 in credit" is idempotent, whereas the operation "add $1,000 to my account" is not. A process is idempotent if it comprises only idempotent operations.

In chapter 10, Gray and Reuter discuss formulating transactions with idempotence in mind, describing, for example, a method of transaction logging termed value logging. Value logging records both old values and new values of object states, so that each operation using the log is idempotent, and operating either an UNDO or a REDO process using the log renders both processes idempotent.

SUMMARY OF THE INVENTION

In embodiments of the present invention, a transaction comprises an initial sequence of computer operations. Idempotent operations comprised within the sequence of computer operations are identified, and the initial sequence is reordered to form a final reordered sequence comprising a first sub-sequence of the computer operations followed by a second sub-sequence of the operations. The reordering constrains the second sub-sequence to have only idempotent operations, and also ensures that the initial sequence and the reordered sequence generate identical results on implementation. The reordering of the initial sequence of operations is typically performed iteratively, and when the reordering is complete an indicator is positioned at the transition from the first sub-sequence to the second sub-sequence.

During processing of the transaction, a transaction manager monitors a state of the indicator, the state changing as operations of the first sub-sequence complete and those of the second sub-sequence begin. In the event of a failure of the transaction, the transaction manager recovers from the failure using knowledge of the state of the indicator. If the indicator shows that the first sub-sequence has not completed, the complete transaction is processed again. If the indicator shows that the first sub-sequence has completed, only the second sub-sequence operations are reprocessed. Since the second sub-sequence comprises only idempotent operations, some or all second sub-sequence operations may be performed again without causing any inconsistency in the final transaction result. Thus, by reordering the transaction so that only idempotent operations are positioned in the second sub-sequence, recovery from a failure of the transaction is facilitated. Furthermore, monitoring and changing the state of the indicator requires minimal management overhead.

Operations of the initial sequence which are idempotent, as well as operations—herein termed non-idempotent operations—which may not be idempotent, are typically categorized as such by generating a graph of the initial sequence. Operations are classified into one of the two categories by analyzing the topology of the graph. In addition, the graph enables adjacent operations in the initial sequence, and in any reordered sequence, to be checked for commutativity. Using commutativity properties enables all non-idempotent operations to be placed in the first sub-sequence, and a maximal number of idempotent operations to be placed in the second sub-sequence, without changing the result of the transaction when its operations are reordered.

Pairs of commutative idempotent operations may also be classified into a third category of operations, termed parallel idempotent operations. Parallel idempotent operations may be manipulated as one single operation. Identifying parallel idempotent operations within the initial sequence, and manipulating the parallel operations as single operations during the reordering, significantly reduces the number of iterations that need to be performed before the final reordered sequence is generated.

There is therefore provided, according to an embodiment of the present invention, a method for optimizing a transaction including an initial sequence of computer operations, including:

identifying one or more idempotent operations included within the initial sequence; and reordering the initial sequence to form a reordered sequence including a first sub-sequence of the computer operations followed by a second sub-sequence of the computer operations, the second sub-sequence including only the one or more idempotent operations.

Typically, the initial sequence and the reordered sequence generate an identical result on implementation.

The method may include inserting a code object between the first sub-sequence and the second sub-sequence, the code object having a value indicative of one of the states of: initiation of the transaction, completion of the first sub-sequence, and completion of the transaction. In an embodiment, the method also includes reprocessing the transaction in response to the value of the code object.

In an alternative embodiment, identifying the one or more idempotent operations includes determining a topographical relationship of a graph of the initial sequence of computer operations. The initial sequence of computer operations may include a plurality of computer operations each having a respective variable equated to a function, wherein the graph includes vertices representative of the variables and the functions, and directed line segments connecting the vertices. Identifying the one or more idempotent operations typically includes determining a closed loop including the directed line segments connecting the vertices of the one or more idempotent operations.

In an embodiment, identifying the one or more idempotent operations includes categorizing computer operations of the initial sequence as one of definitely-idempotent-operations and not-definitely-idempotent-operations.

In an alternative embodiment, the method includes identifying one or more pairs of the computer operations as being commutative, wherein reordering the initial sequence includes reordering the initial sequence in response to identifying the one or more pairs. Alternatively or additionally, identifying the one or more pairs includes identifying the one or more pairs iteratively. Further alternatively or additionally, identifying the one or more pairs includes identifying the one or more pairs in response to a topographical relationship of a graph of the initial sequence of computer operations.

In an embodiment, identifying the one or more idempotent operations includes identifying two idempotent operations as commutative, wherein reordering the initial sequence includes manipulating the two idempotent operations as a single computer operation.

In an alternative embodiment, identifying the one or more idempotent operations includes:

in a run-time categorization of one of the computer operations including a variable equated to an expression, evaluating the expression to form a first value of the variable;

substituting the first value of the variable into the expression and evaluating the expression to form a second value of the variable; and comparing the first value with the second value.

Typically, identifying the one or more idempotent operations and reordering the initial sequence includes a computer programmer performing the identifying and the reordering, and further includes a processing unit checking that the reordered sequence is optimally ordered.

There is further provided, according to an embodiment of the present invention, apparatus for optimizing a transaction including an initial sequence of computer operations, including:

a processing unit which identifies one or more idempotent operations included within the initial sequence, and which reorders the initial sequence to form a reordered sequence including a first sub-sequence of the computer operations followed by a second sub-sequence of the computer operations, the second sub-sequence including only the one or more idempotent operations.

There is further provided, according to an embodiment of the present invention, a computer software product for optimizing a transaction including an initial sequence of computer operations, the product including a computer-readable medium having program instructions recorded therein, which instructions, when read by a computer, cause the computer to identify one or more idempotent operations included within the initial sequence and reorder the initial sequence to form a reordered sequence including a first sub-sequence of the computer operations followed by a second sub-sequence of the computer operations, the second sub-sequence including only the one or more idempotent operations.

The present invention will be more fully understood from the following detailed description of the preferred embodiments thereof, taken together with the drawings, a brief description of which follows.

DETAILED DESCRIPTION OF EMBODIMENTS

Figure 1:
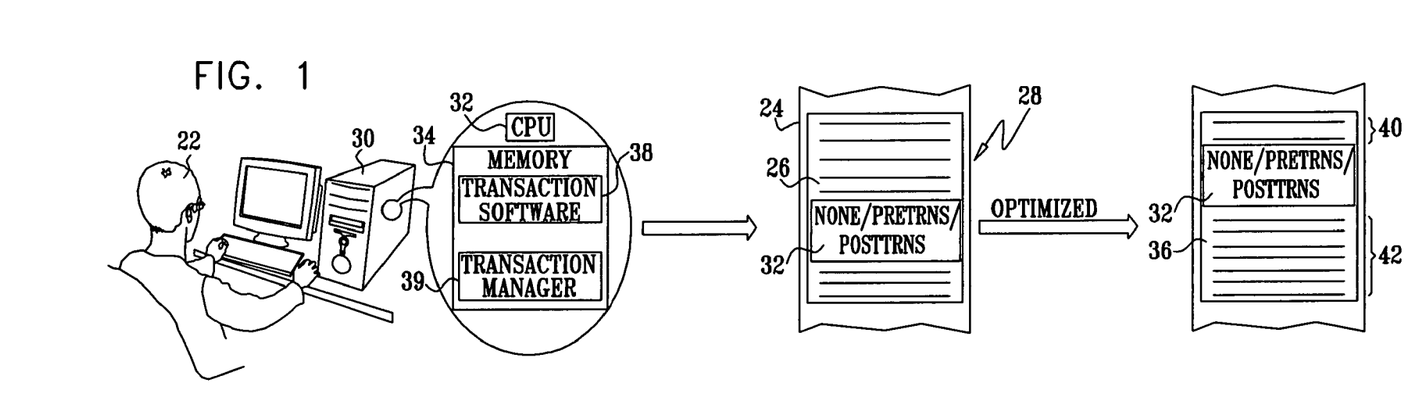
FIG. 1 is a schematic illustration of a process used for optimizing a transaction, according to an embodiment of the present invention.

Reference is now made to FIG. 1, which is a schematic illustration of a process used for optimizing a transaction, according to an embodiment of the present invention. A programmer 22 generates code 24, within which is incorporated an initial transaction 26, comprising an initial sequence 28 of computer operations. Programmer 22 uses a computer 30 to generate code 24, and typically incorporates within initial transaction 26 a code object 32, also herein referred to as a flag, which is capable of taking three states, termed none, pre-transition, and post-transition. The function of object 32, and where it is incorporated in initial transaction 26 and an optimized transaction 36 derived therefrom, are described in more detail below. As is also described in more detail below, transaction 36 comprises an initial sub-sequence 40 and a final sub-sequence 42.

The computer comprises a central processing unit (CPU) 32 and a memory 34 wherein code 24 may be stored. Computer 30 typically comprises an industry-standard personal computer or server. Memory 34 also comprises a transaction manager 39 which manages and tracks the progress of transactions as they are processed. Memory 34 further comprises transaction software 38, which is used for optimizing transactions such as transaction 26 to optimized transaction 36, as is described in more detail hereinbelow. Software 38 may be provided to computer 30 as a computer software product in a tangible form on a computer-readable medium such as a CD-ROM, or as an electronic data transmission, or as a mixture of both forms.

Figure 2:
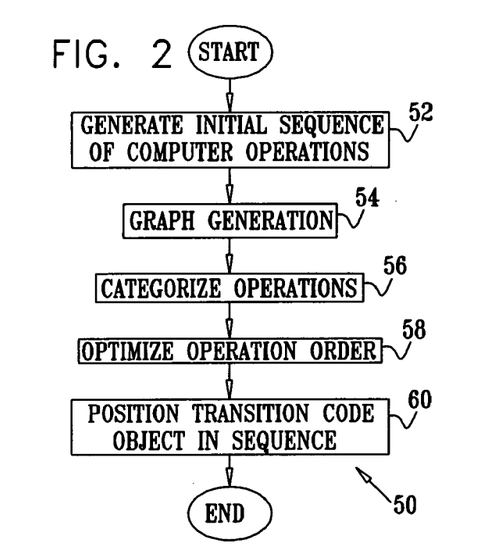
FIG. 2 is a flowchart of steps involved in optimizing a transaction, according to an embodiment of the present invention.

FIG. 2 is a flowchart 50 of steps involved in optimizing transaction 26, according to an embodiment of the present invention. Flowchart 50 describes an overall process for optimizing transactions that is implemented by software 38, and steps of the flowchart are described in more detail below. In an initial step 52, programmer 22 generates initial sequence 28 of computer operations, to form initial transaction 26. In the following description, unless otherwise stated it is assumed that initial sequence 28 is as listed in Table I below, and the initial sequence is also referred to herein as the "Table I sequence."

TABLE I

| Initial Sequence | Computer Operation | | |
|---|---|---|---|
| Number | Variable | := | Function |
| 1 | x | := | f(z, y) |
| 2 | x | := | h(z) |
| 3 | x | := | g(r, x) |
| 4 | t | := | f(z) |
| 5 | x | := | h(x) |

In an embodiment of the present invention, programmer 22 at least partially applies the optimizing transaction procedures described herein in generating initial sequence 28.

In a graph generating step 54, a graph of initial sequence 28 is generated. The graph comprises vertices and line segments connecting the vertices. The vertices and the line segments are derived from variables and functions of the computer operations of sequence 28.

In an operation categorization step 56, initial sequence 28 is analyzed. The analysis comprises categorizing, using the graph generated in step 54, those computer operations in sequence 28 that are definitely idempotent, as defined in the Background of the Invention. The analysis also comprises categorizing, using the graph, adjacent pairs of computer operations in sequence 28 as commutative or non-commutative.

In an optimization step 58, the sequence of computer operations is reordered to form optimized transaction 36. The reordering rearranges the computer transactions so that there are a maximum number of idempotent operations at the end of the reordered sequence, while ensuring that results generated by implementing the reordered sequence are the same as results generated by initial sequence 28.

The reordering rearranges initial sequence 28 into a reordered sequence having two sub-sequences of computer operations, final sub-sequence 42 (FIG. 1) comprising only idempotent computer operations, and initial sub-sequence 40 which may comprise idempotent computer operations, non-idempotent computer operations, or both types of operations.

In a final step 60, code object 32 is positioned to act as a transition between initial sub-sequence 40 and final sub-sequence 42. If programmer 22 has incorporated code object 32 into code 24, the code object may require repositioning, by software 38, so as to correctly act as the transition. If programmer 22 has not initially incorporated code object 32 into the code, software 38 is configured to automatically incorporate the code object between sub-sequences 40 and 42.

Flowchart 50 is typically implemented by software 38 before the transaction is processed by CPU 32. In some embodiments of the present invention, described in more detail below, at least some of the steps of flowchart 50 are implemented by CPU 32 in a run-time mode, as the transaction is processed.

Figure 3:
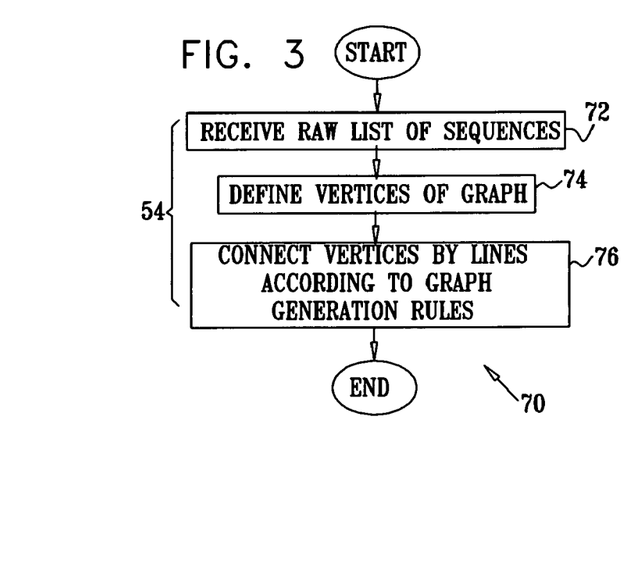
FIG. 3 is a flowchart of steps comprised in generating a graph, for a graph generation step of the flowchart of FIG. 2, according to an embodiment of the present invention.
Figure 4:
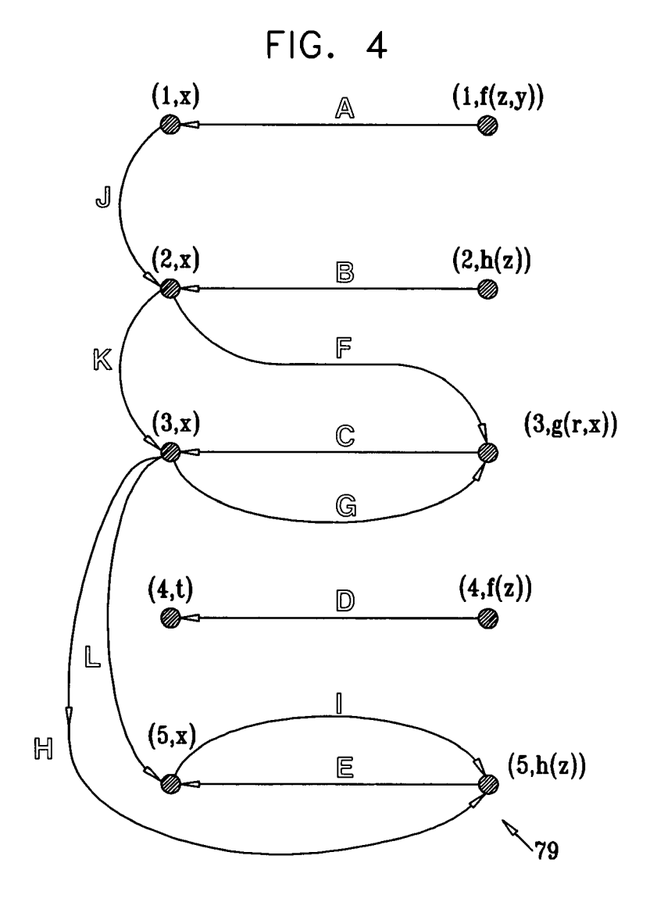
FIG. 4 is a graph derived from an initial sequence of computer operations, according to an embodiment of the present invention.

FIG. 3 is a flowchart 70 of steps comprised in graph generation step 54 of flowchart 50, and FIG. 4 is a graph 79 derived from initial sequence 28 of computer operations, according to embodiments of the present invention.

The following description is drawn to testing a physical implementation of graph 79, for reasons of clarity. However, it will be understood that references herein to testing topological features of a graph such as graph 79 may most preferably be performed by software comprised in transaction software 38. Such software typically analyzes topological features of a graph given elements such as vertices and line segments connecting the vertices, and will be familiar to those skilled in the art.

In a first step 72 of flowchart 70, software 38 receives the computer operations of the Table I sequence. It will be appreciated that the Table I sequence typically comprises one of many sequences of computer operations incorporated into code 24, each sequence corresponding to a different transaction. Typically each sequence is initiated and terminated by code statements such as begin_transaction and end_transaction, which enable software 38 to automatically identify sequences of transactions such as the sequence of Table I. It will be appreciated, however, that any other suitable method for identifying a sequence in code 24 may be used to provide software 38 with the computer operations comprised in the initial sequence.

In a define graph vertices step 74, variable vertices, comprising the different terms on the left side of each of the operations of the Table I sequence, are determined. Each variable vertex is an ordered pair comprising a sequence number and a variable, of the form (sn,v) where sn is the sequence number and v is the variable of the sequence. Thus, from Table I, the variable vertices are (1,x), (2, x), (3, x), (4, t), and (5, x). Function vertices, comprising the different expressions on the right side of each of the operations of the Table I sequence, are also determined. Each function vertex is an ordered pair comprising a sequence number and a function, of the form (sn,k) where sn is the sequence number and k is the function of the sequence. Thus, from Table I, the function vertices are (1,f(z,y)), (2, h(z)), (3, g(r,x)), (4, f(z)), and (5, h(x)).

Graph 79 comprises the variable and the function vertices, so that for the Table I sequence, graph 79 comprises ten vertices (1,x), (2, x), (3, x), (4, t), (5, x), (1,f(z,y)), (2, h(z)), (3, g(r,x)), (4, f(z)), and (5, h(x)).

In a final step 76, directed line segments between the vertices determined in step 74 are constructed. In the following description of forming the line segments, a general computer operation, in a sequence of operations comprising a transaction, is assumed to be:

$$sn\ v := k(a, b, \ldots)$$

where sn represents a sequence number of the operation, v represents a variable of the operation, k represents a function, the value of which is assigned to the variable, and a, b, . . . represent arguments of the function.

Directed line segments are constructed between the vertices of graph 79 according to the following rules:

Rule I: For each computer operation sn, a directed line segment is constructed from each function vertex (sn,k) to its variable vertex (sn,v).

Rule II: For i<j, a directed line segment is constructed from a variable vertex (sn,v) of a sequence number i to a function vertex (sn,k) of a sequence number j, if:

v appears as an argument in function k, and there is no computer operation between sequence i and sequence j for which v is a variable.

Rule III: For i=j, a directed line segment is constructed from the variable vertex (sn,v) to the function vertex (sn,k) if v appears as an argument of k.

Rule IV: For each pair of computer operations sn, sp, p>n, a directed line segment is constructed from the variable vertex (sn,v) to the variable vertex (sp,v) if the same variable v is in both operations and variable v does not appear in an operation between n and p.

Applying the rules above to vertices of graph 79 generates directed line segments A, B, . . . , L of the graph, as given in Table II below.

TABLE II

| Directed Line Segment | Generating Rule | Applicable sequence number(s) | Segment Identifier |
|---|---|---|---|
| (1, f(z, y))→(1, x) | I | 1 | A |
| (2, h(z))→(2, x) | I | 2 | B |
| (3, g(r, x))→(3, x) | I | 3 | C |
| (4, f(z))→(4, t) | I | 4 | D |
| (5, h(x))→(5, x) | I | 5 | E |
| (2, x)→(3, g(r, x)) | II | 2, 3 | F |
| (3, x)→(3, g(r, x)) | III | 3 | G |

TABLE II-continued

| Directed Line Segment | Generating Rule | Applicable sequence number(s) | Segment Identifier |
|---|---|---|---|
| (3, x)→(5, h(x)) | II | 3, 5 | H |
| (5, x)→(5, h(x)) | III | 5 | I |
| (1, x)→(2, x) | IV | 1, 2 | J |
| (2, x)→(3, x) | IV | 2, 3 | K |
| (3, x)→(5, x) | IV | 3, 5 | L |

Forming the line segments, as described hereinabove for flowchart 70, corresponds to completing step 54 of overall flowchart 50.

Figure 5:
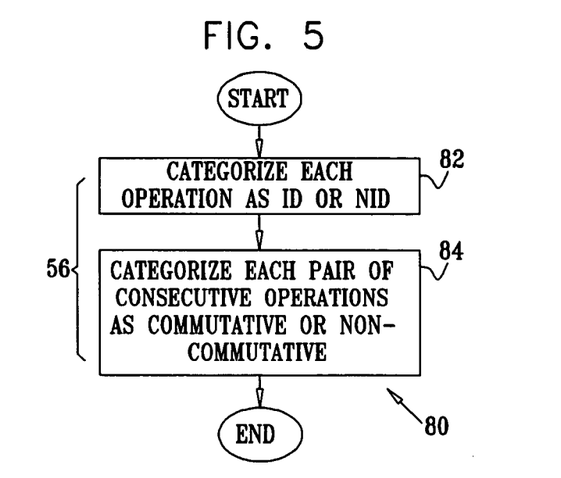
FIG. 5 is a flowchart of steps comprised in a categorize operations step of the flowchart of FIG. 2, according to an embodiment of the present invention.

FIG. 5 is a flowchart 80 of steps comprised in categorize operations step 56 of flowchart 50, according to an embodiment of the present invention. In a first categorization step 82 graph 79 is used to identify operations in the Table I sequence which are definitely idempotent. Idempotency is determined according to the following rule:

Rule V: If, for directed line segments constructed according to Rules I, II, or III, the computer operation is not contained in a loop, then the operation is idempotent.

Graph 79 shows that operation 1 is not contained in a loop. Applying rule V gives that operation 1 is definitely idempotent. Similarly, operations 2 and 4 are definitely idempotent, since neither are contained in loops.

Rule V determines operations that are definitely idempotent; other operations may or may not be idempotent. For example, operation 3 may not be idempotent since it contains a loop; similarly, operation 5 may not be idempotent since it also contains a loop. Hereinbelow, an operation that has been classified by rule V as definitely idempotent is referred to as an ID operation; an operation that under rule V is indeterminate is referred to as an NID operation.

In a second categorization step 84, graph 79 is used to identify consecutive operations that are commutative. Two computer operations X, Y are assumed to be commutative if the result of performing first X then Y is the same as the result of performing Y then X. Commutativity of computer operations is determined according to the following rule:

Rule VI: Two consecutive computer operations X, Y are commutative if there is no line segment connecting the vertices of operation X and the vertices of operation Y.

Graph 79 shows that operation 3 and operation 4 are commutative; also operation 4 and operation 5 are commutative. Because they have connecting line segments, operations 1 and 2 are non-commutative, as are operations 2 and 3.

Completing categorization step 84 corresponds to completing step 56 of overall flowchart 50. The categories determined for transaction 26 are shown in Table III below. In Table III, as in other Tables hereinbelow, categorization of an operation as commutative or non-commutative applies to the operation and its immediately following operation.

TABLE III

| Initial Sequence Number | Computer Operation | | | | Category |
|---|---|---|---|---|---|
| | Variable | := | Function | NID/ID | Commutative/Non-commutative (with the operation following) |
| 1 | x | := | f(z, y) | ID | Non-commutative |
| 2 | x | := | h(z) | ID | Non-commutative |

TABLE III-continued

| Initial Sequence | Computer Operation | | | Category | |
|---|---|---|---|---|---|
| | | | | | Commutative/ Non-commutative (with the operation |
| Number | Variable | := | Function | NID/ID | following) |
| 3 | x | := | g(r, x) | NID | Commutative |
| 4 | t | := | f(z) | ID | Commutative |
| 5 | x | := | h(x) | NID | |

Figure 6:
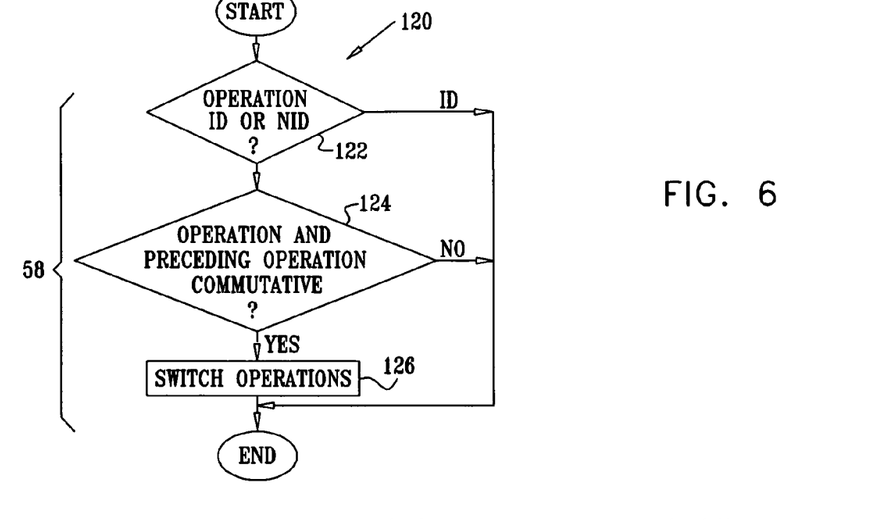
FIG. 6 is a flowchart of a process used in reordering the operations of a transaction, for an optimization step of the flowchart of FIG. 2, according to an embodiment of the present invention.

FIG. 6 is a flowchart 120 of a process used in reordering the operations of transaction 26, according to an embodiment of the present invention. The reordering maintains the result of the initial transaction and of the reordered transaction the same. The process is applied in succession to each of the operations of sequence 26 starting from the end of the sequence, and the application of the process, as described below, corresponds to optimization step 58 of flowchart 50.

After a first complete pass through the sequence, the process of flowchart 120 is reapplied to the sequence iteratively. The iterations end when the orders of operations of two consecutive complete passes of the flowchart through the sequence are the same.

Thus, for the Table I sequence, a first iteration of the process starts by flowchart 120 being applied to the operation having initial sequence number 5.

In an idempotent test step 122, the computer operation is tested to see whether it has been classified—from Rule V—as being an ID operation or as an NID operation. If the operation is determined to be an ID operation, the flowchart as applied to the computer operation under test ends. If the test shows the computer operation is an NID operation, then a second test step 124 is applied.

In commutativity test step 124 the computer operation under test, and the immediately preceding operation, are tested to see if they are commutative using Rule VI. If the two operations are not commutative, then the process as applied to the computer operation under test ends. If the two operations are commutative, the operations are switched in a step 126, and the process for the operation under test ends.

Once flowchart 120 has ended for a particular operation, the flowchart is applied to the previous operation in the sequence of operations.

Applying the flowchart to the Table I sequence, the operation corresponding to initial sequence number 5, i.e., x:=h(x), is first tested. The test of step 122 gives that the operation is an NID operation. Step 124 shows that the operation and the operation corresponding to initial sequence number 4 (t:=f(z)) are commutative. In step 126 operations x:=h(x) and t:=f(z) are switched in order, and the application of flowchart 120 to operation x:=h(x) ends. The result of applying flowchart 120 to the operation of initial sequence number 5 thus generates a reordered sequence of computer operations. The reordered sequence is given by Table IV below.

TABLE IV

| Reordered Sequence | Computer Operation | | |
|---|---|---|---|
| Number | Variable | := | Function |
| 1 | x | := | f(z, y) |
| 2 | x | := | h(z) |
| 3 | x | := | g(r, x) |
| 4 | x | := | h(x) |
| 5 | t | := | f(z) |

Flowchart 120 is then applied to the operation corresponding to reordered sequence number 4. In this example the operation of reordered sequence number 4 is the same as that of initial sequence number 5, i.e., x:=h(x). However, because the operation is within a reordered sequence the result of applying flowchart 120 may generate further changes to the sequence order.

Idempotent test step 122 shows that reordered sequence number 4 operation is an NID operation.

Commutativity test step 124 is applied to reordered sequence number 4 operation and reordered sequence number 3 operation. As shown in graph 79, the operations are coupled by connecting line segment L and also connecting line segment H. Either connection is sufficient to make Rule VI invalid, so that the two operations are not commutative. The operations are therefore not switched, and the application of flowchart 120 to the operation of reordered sequence number 4 ends.

Flowchart 120 is next applied to the operation of reordered sequence number 3. The test of step 122 shows that the operation is an NID operation. The test of step 124 gives that operation number 3 and preceding operation number 2 are not commutative, since in graph 79 the two operations are connected by line segment K and also by line segment F. The operations 3 and 2 are therefore not switched, and the application of flowchart 120 to operation number 3 ends.

Finally, flowchart 120 is applied to the operation of reordered sequence number 2. Step 122 results in the operation being classified as an ID operation, so that no further action is taken on operation 2. The first iteration thus results in a sequence of operations corresponding to Table IV.

In a second iteration flowchart 120 is applied in succession to each of the operations of the sequence determined by the first iteration, i.e., Table IV. The second iteration does not generate any further operation reordering. Since the two iterative passes result in the same order of operations, the process of iteration stops, corresponding to completion of optimization step 58 (FIG. 2).

Table V below is an example of an alternative set of sequences. The sequences of Table V are a rearranged set of sequences of Table I. Assuming that initial sequence 28 is as listed in Table V, steps 52, 54, 56, and 58 of flowchart 50 are applied to Table V.

TABLE V

| Initial Sequence | Computer Operation | | |
|---|---|---|---|
| Number | Variable | := | Function |
| 1 | t | := | f(z) |
| 2 | x | := | f(z, y) |
| 3 | x | := | h(z) |
| 4 | x | := | g(r, x) |
| 5 | x | := | h(x) |

Figure 7:
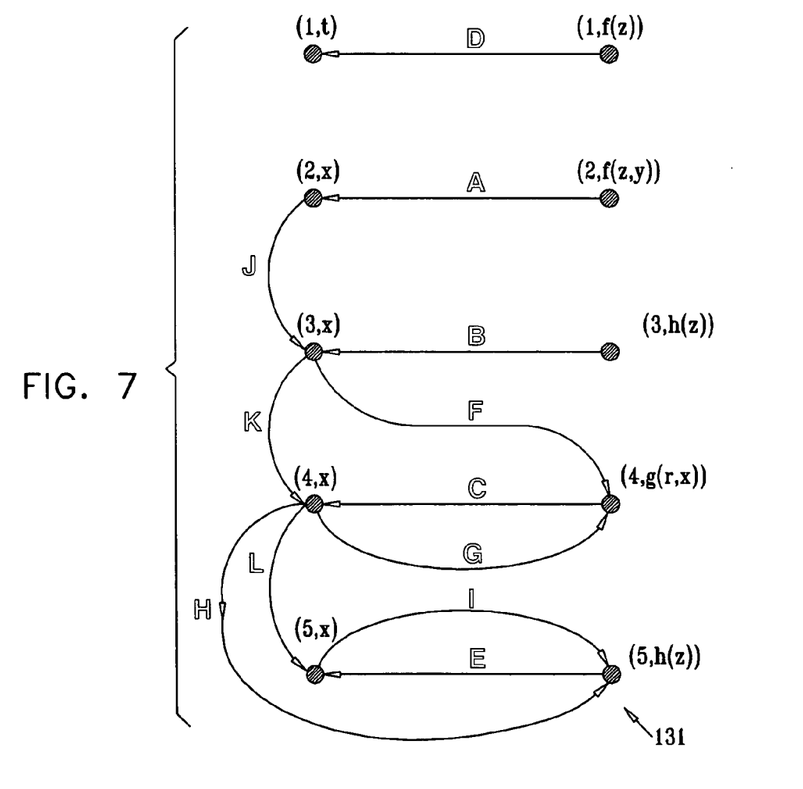
FIG. 7 is a graph derived from an alternative sequence of operations, according to an embodiment of the present invention.

FIG. 7 is a graph 131, generated in step 54 of flowchart 50 for Table V operations, according to an embodiment of the present invention. It will be appreciated that graph 131 is topologically the same as graph 79. Step 56 of flowchart 50 gives, for the operations of Table V, the categories listed in Table VI below.

TABLE VI

| Initial Sequence Number | Computer Operation | | | | Category |
|---|---|---|---|---|---|
| | Variable | := | Function | NID/ID | Commutative/Non-commutative (with the operation following) |
| 1 | t | := | f(z) | ID | Commutative |
| 2 | x | := | f(z, y) | ID | Non-commutative |
| 3 | x | := | h(z) | ID | Non-commutative |
| 4 | x | := | g(r, x) | NID | Non-commutative |
| 5 | x | := | h(x) | NID | |

Applying step 58 to the operations of Table V requires a total of five iterations of application of flowchart 120, before the requirement for completing step 58 (that there is no change in order of operations) is satisfied. Each of the first four iterations moves operation t:=f(z) down by one in the order of operations, until it becomes the fifth operation. The fifth iteration verifies that after the fourth iteration there is no change in the order. The final set of operations resulting from step 58 is given by Table IV above.

Thus, iterative application of flowchart 120 to operations of sequence 26, exemplified in Table I and Table V, gives a final reordered optimized sequence corresponding to Table IV. The optimization reorders the order of the operations of a transaction while maintaining the same final result as is given by the initial set of sequences of the transaction. The optimization ensures that a maximum number of operations which are only ID operations are located at the end of the reordered sequence, in a final sub-sequence. Thus, Table IV has an initial sub-sequence of operations 1, 2, 3, 4, and a final sub-sequence of operations 5. Initial sub-sequence of operations 1, 2, 3, and 4 corresponds to initial sub-sequence 40 (FIG. 1), and the final sub-sequence, operation 5, corresponds to final sub-sequence 42.

Returning to flowchart 50, in final step 60 code object 32 is positioned between initial sub-sequence 40 and final sub-sequence 42, so that the optimized transaction code is as shown in Table VII below.

TABLE VII

| x | := | f(z, y) |
|---|---|---|
| x | := | h(z) |
| x | := | g(r, x) |
| x | := | h(x) |
| | Code object | |
| t | := | f(z) |

The properties of commutativity may be further applied to a sequence of operations of a transaction in order to ensure that the number of idempotent operations in final sub-sequence 42 is a maximum. To illustrate how commutativity properties may be so applied, initial sequence 28 is assumed to be given by the operations of Table VIII below.

TABLE VIII

| Initial Sequence Number | Computer Operation | | |
|---|---|---|---|
| | Variable | := | Function |
| 1 | x | := | f(z, y) |
| 2 | b | := | g(a) |
| 3 | c | := | g(d) |
| 4 | x | := | h(z) |
| 5 | x | := | h(x) |

Steps 52, 54, and 56 of flowchart 50 are applied to the operations of Table VIII.

Figure 8:
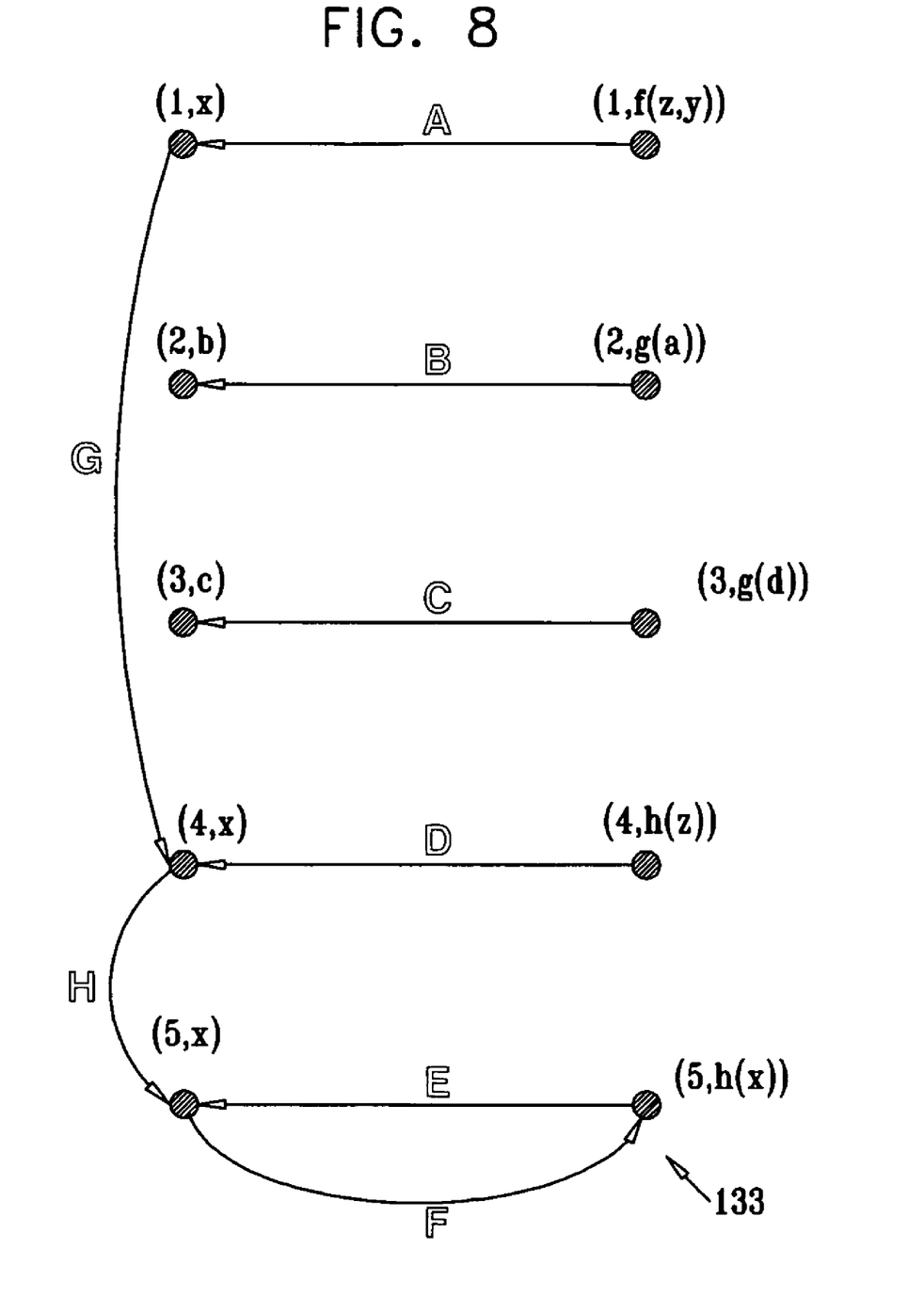
FIG. 8 is a graph derived from another alternative sequence of operations, according to an embodiment of the present invention.

FIG. 8 is a graph 133 of Table VIII operations generated in step 54 of flowchart 50, according to an embodiment of the present invention. Step 56 of flowchart 50 gives, for the operations of Table VIII, the categories listed in Table XI below.

TABLE XI

| Initial Sequence Number | Computer Operation | | | | Category |
|---|---|---|---|---|---|
| | Variable | := | Function | NID/ID | Commutative/Non-commutative (with the operation following) |
| 1 | x | := | f(z, y) | ID | Commutative |
| 2 | b | := | g(a) | ID | Commutative |
| 3 | c | := | g(d) | ID | Commutative |
| 4 | x | := | h(z) | ID | Non-commutative |
| 5 | x | := | h(x) | NID | |

Applying step 58 of flowchart 50, corresponding to successively applying flowchart 120 (FIG. 6) to each of the operations in Table VIII, does not give any further reordering of initial sequence 28. However, since operations 1 and 2, operations 2 and 3, and operations 3 and 4 are commutative, within at least some of these pairs operations may be switched in order. After the order has been switched, the commutative part of step 56 and then step 58 may be reapplied to check if any further reordering is possible.

Figure 9:
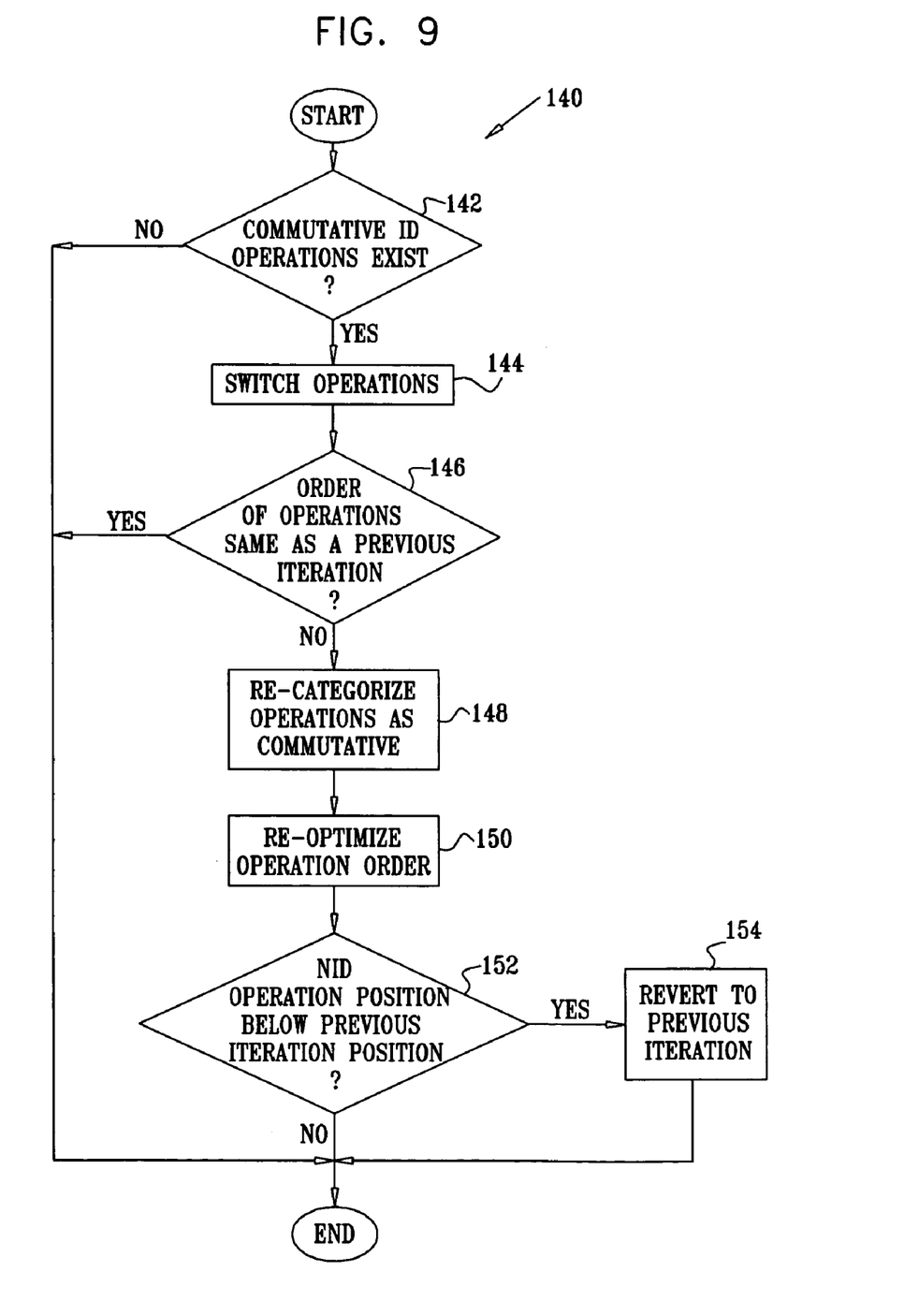
FIG. 9 is a flowchart for checking if further reordering of the initial sequence of computer operations is possible, according to an embodiment of the present invention.

FIG. 9 is a flowchart 140 for checking if further reordering of initial sequence 28 is possible, according to an embodiment of the present invention. Flowchart 140 is typically applied after step 58 (flowchart 50) has completed and before step 60 of flowchart 50, described in more detail below, is implemented.

In a first step 142, pairs of ID operations are checked for commutativity. If there are no existing commutative ID operations, the flowchart ends.

In a second step 144, commutative ID operations are switched in position. Herein it is assumed that a maximum possible number of commutative ID operations are switched.

In a third step 146, the order of all the operations of the transaction is checked to see if it is the same as the order of a previous iteration of flowchart 140. If it is the same, flowchart 140 ends.

In a fourth step 148, all the operations of the transaction are rechecked for commutativity. This corresponds to applying step 84 of flowchart 80 to the set of operations. It will be understood that because of the switched order of operations in step 144, the recheck for commutativity may lead to new pairs of operations being found to be commutative.

In a fifth step 150, the process of flowchart 120 (FIG. 6) is successively reapplied. Successive reapplication of flowchart 120, corresponding to completion of step 58 of flowchart 50, attempts to raise the position of an NID operation in the sequence of operations.

In a sixth step 152, the position of the NID operation is checked to see if it is below its position in a previous iteration of flowchart 140. If it is below, in a seventh step 154 the order of the operations reverts to the order of the previous iteration, and flowchart 130 ends. If the position of the NID operation is not below its position in the previous iteration, the flowchart returns to step 142 to begin a new iteration.

Tables XIa-XIe below show orders and categories of the operations of Table XI, after application of flowchart 140 to the operations. The iteration and the last completed step is noted in the header of each table.

TABLE XIa

First iteration, end of step 148. (Operations 1 and 2 switched, operations 3 and 4 switched.)

| Initial Sequence Number | Computer Operation | | | | Category |
|---|---|---|---|---|---|
| | Variable | := | Function | NID/ID | Commutative/Non-commutative ID operations (with the operation following) |
| 2 | b | := | g(a) | ID | Commutative |
| 1 | x | := | f(z, y) | ID | Non-commutative |
| 4 | x | := | h(z) | ID | Commutative |
| 3 | c | := | g(d) | ID | |
| 5 | x | := | h(x) | NID | |

TABLE XIb

First iteration, end of step 150.

| Initial Sequence Number | Computer Operation | | | | Category |
|---|---|---|---|---|---|
| | Variable | := | Function | NID/ID | Commutative/Non-commutative ID operations (with the operation following) |
| 2 | b | := | g(a) | ID | Commutative |
| 1 | x | := | f(z, y) | ID | Non-commutative |
| 4 | x | := | h(z) | ID | |
| 5 | x | := | h(x) | NID | |
| 3 | c | := | g(d) | ID | |

TABLE XIc

Second iteration, end of step 150.

| Initial Sequence Number | Computer Operation | | | | Category |
|---|---|---|---|---|---|
| | Variable | := | Function | NID/ID | Commutative/Non-commutative ID operations (with the operation following) |
| 1 | x | := | f(z, y) | ID | Commutative |
| 2 | b | := | g(a) | ID | Commutative |
| 4 | x | := | h(z) | ID | |

TABLE XIc-continued

Second iteration, end of step 150.

| Initial Sequence Number | Computer Operation | | | | Category |
|---|---|---|---|---|---|
| | Variable | := | Function | NID/ID | Commutative/Non-commutative ID operations (with the operation following) |
| 5 | x | := | h(x) | NID | |
| 3 | c | := | g(d) | ID | |

TABLE XId

Third iteration, end of step 148.

| Initial Sequence Number | Computer Operation | | | | Category |
|---|---|---|---|---|---|
| | Variable | := | Function | NID/ID | Commutative/Non-commutative ID operations (with the operation following) |
| 1 | x | := | f(z, y) | ID | Non-commutative |
| 4 | x | := | h(z) | ID | Commutative |
| 2 | b | := | g(a) | ID | |
| 5 | x | := | h(x) | NID | |
| 3 | c | := | g(d) | ID | |

TABLE XIe

Third iteration, end of step 150.

| Initial Sequence Number | Computer Operation | | | | Category |
|---|---|---|---|---|---|
| | Variable | := | Function | NID/ID | Commutative/Non-commutative ID operations (with the operation following) |
| 1 | x | := | f(z, y) | ID | Non-commutative |
| 4 | x | := | h(z) | ID | Non-commutative |
| 5 | x | := | h(x) | NID | |
| 2 | b | := | g(a) | ID | |
| 3 | c | := | g(d) | ID | |

The results shown in Table XIe correspond to the final results from applying the process of flowchart 140 to the operations of Table XI.

Returning to flowchart 50, in final step 60 code object 32 is positioned between operations x:=h(x) and b:=g(a) of Table XIe, so that the optimized transaction code of Table VIII is as shown in Table XII below.

TABLE XII

| x | := | f(z, y) |
|---|---|---|
| x | := | h(z) |
| x | := | h(x) |

TABLE XII-continued

| Code object | | |
|---|---|---|
| b | := | g(a) |
| c | := | g(d) |

Figure 10:
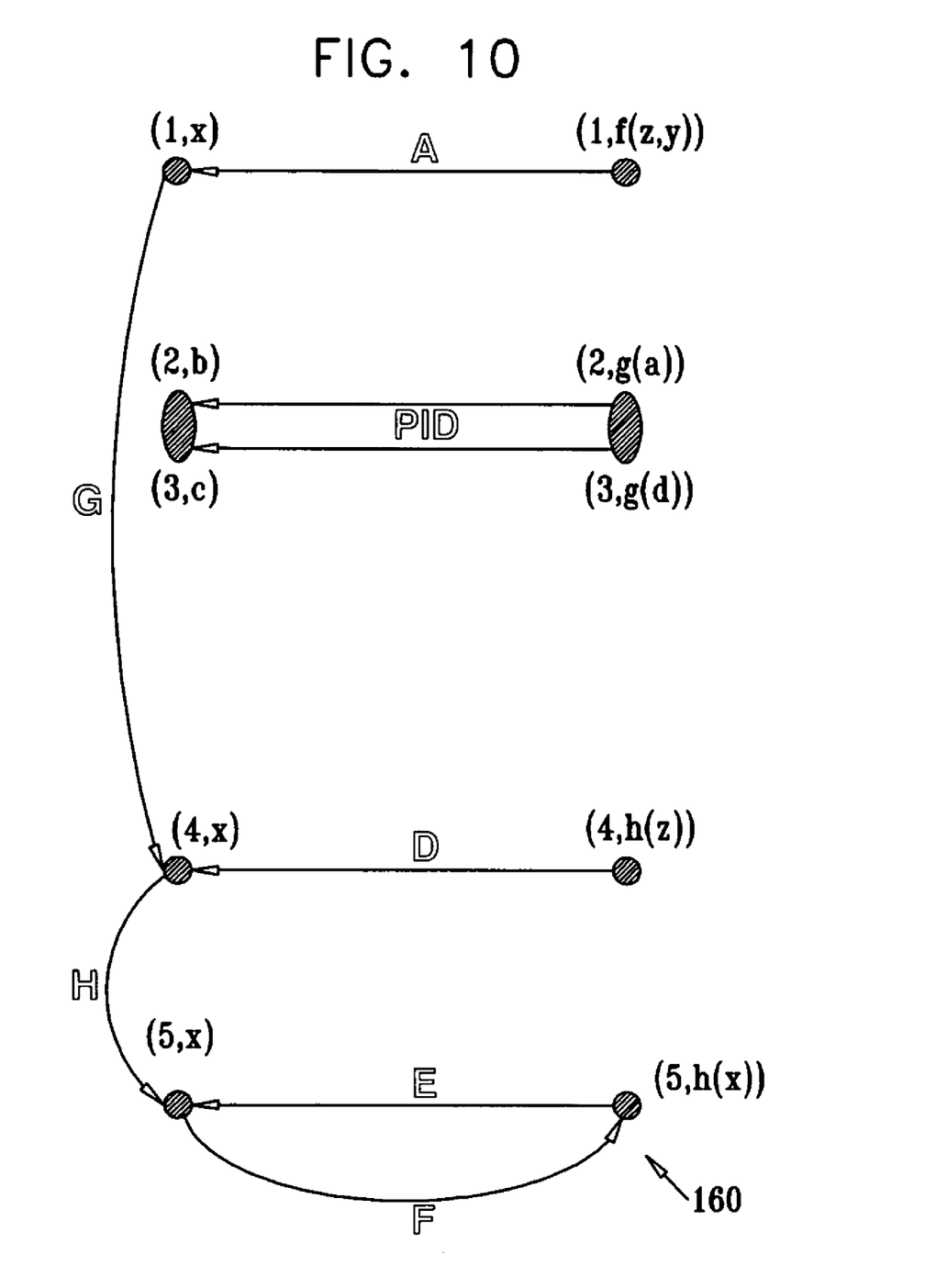
FIG. 10 is a graph of computer operations illustrating a classification of idempotent operations as parallel idempotent operations, according to an embodiment of the present invention.

FIG. 10 is a graph 160 of Table VIII operations illustrating a classification of idempotent operations as parallel idempotent (PID) operations, according to an embodiment of the present invention. As is shown hereinbelow, classification of ID operations as PID operations leads to significant savings in computation resources required to optimize the order of transaction operations.

PID operations are assumed to be pairs of operations which are both idempotent and commutative. If there are two operations A, B, which are atomic, then A;B is assumed to represent performing operation A before operation B, and a result of A;B is represented by [A;B]. If A, B are PID operations, then A∥B is assumed to represent A;B or B;A. Those skilled in the art will be able to verify that:

If A∥B fails and A∥B executes again, then the result is [A∥B].

Returning to Table XI, operations 2 and 3, b:=g(a) and c:=g(d) are idempotent operations, and are also commutative. Thus, operations 2 and 3 are PID operations, and may be represented as equation (1):

$$(b,c) = (g(a), g(d)) \quad (1)$$

In an embodiment of the present invention, step 56 of flowchart 50 comprises categorizing operations of a transaction as NID, ID, or PID operations. Applying such a categorization to the initial sequence of Table VIII gives Table XIII as the result of step 56. Applying step 58 of flowchart 50, to each of the operations in Table XIII, does not give any further reordering.

TABLE XIII

| Initial Sequence | Computer Operation | | | Category |
|---|---|---|---|---|
| | | | | Commutative/ Non-commutative (with the |
| Number | Variable | := | Function | NID/ID following) |
| 1 | x | := | f(z, y) | ID Commutative |
| 2, 3 | (b, c) | := | (g(a), g(d)) | PID Commutative |
| 4 | x | := | h(z) | ID Non-commutative |
| 5 | x | := | h(x) | NID |

The process of flowchart 140 may then be applied to Table XIII. Tables XIIIa-XIIIb below show orders and categories of the operations of Table XIII, after application of flowchart 140. The iteration and the last completed step is noted in the header of each table.

TABLE XIIIA

First iteration, end of step 150. (Operation (2, 3) and operation 4 switched.)

| Initial Sequence | Computer Operation | | | Category |
|---|---|---|---|---|
| | | | | Commutative/ Non-commutative (with the |
| Number | Variable | := | Function | NID/ID operation following) |
| 1 | x | := | f(z, y) | ID Non-commutative |
| 4 | x | := | h(z) | ID Commutative |
| (2, 3) | (b, c) | := | (g(a), g(d)) | PID Commutative |
| 5 | x | := | h(x) | NID |

TABLE XIIIb

Second iteration, end of step 150.

| Initial Sequence | Computer Operation | | | | Category |
|---|---|---|---|---|---|
| | | | | | Commutative/ Non-commutative (with the |
| Number | Variable | := | Function | NID/ ID | operation following) |
| 1 | x | := | f(z, y) | ID | Non-commutative |
| 4 | x | := | h(z) | ID | Non-commutative |
| 5 | x | := | h(x) | NID | Commutative |
| 2, 3 | (b, c) | := | (g(a), g(d)) | PID | |

The results shown in Table XIIIb correspond to the final results from applying the process of flowchart 140 to the operations of Table XIII. Comparing Table XIIIb with Table XIe, it will be appreciated that both display the same result. It will thus be appreciated that categorizing idempotent operations as parallel idempotent operations, then manipulating a transaction as described above, significantly reduces the computation needed to arrive at a final optimized sequence of operations.

Figure 11:
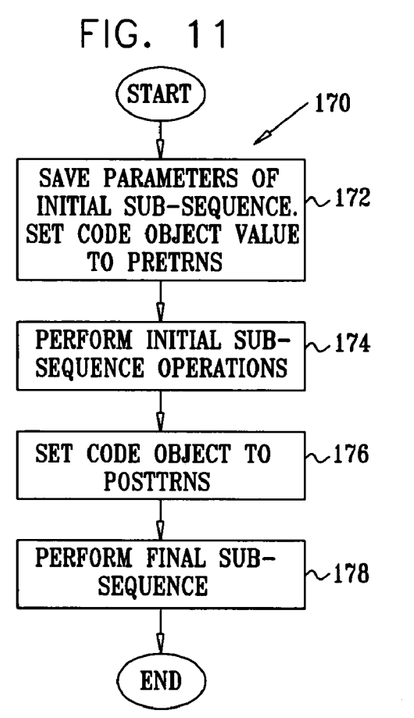
FIG. 11 is a flowchart showing steps performed when a reordered transaction, i.e., a transaction resulting from application of the flowchart of FIG. 2, is processed, according to an embodiment of the present invention.

FIG. 11 is a flowchart 170 showing steps performed when a reordered transaction, i.e., a transaction resulting from application of flowchart 50, is processed, according to an embodiment of the present invention. The steps of flowchart 170 are implemented by transaction manager 39 (FIG. 1), and it is assumed hereinbelow that the reordered transaction is transaction 36.

In a first step 172, manager 39 analyzes the operations of transaction 36 to determine operations comprised in initial sub-sequence 40. All parameters of the initial sub-sequence operations, i.e., parameters that are variables or that are arguments of functions, are saved before beginning to implement the transaction. In addition, manager sets a "pre-transition" value of code object 32 that indicates that initial sub-sequence 40 operations—those before the code object—are being performed. The pre-transition value is herein also termed PRETRNS.

In a second step 174 the operations comprised in initial sub-sequence 40 are performed.

In a third step 176, when all the operations of initial sub-sequence 40 have been committed, i.e., when the code object 32 is reached, the value of the code object is altered to a "post-transition" value that indicates that operations in final sub-sequence 42 are being performed. The post-transition value is herein also termed POSTTRNS.

In a final step 178, all operations in sub-sequence 42 are committed, and the value of code object 32 is set to NONE.

Inspection of the steps of flowchart 170 shows that at the beginning of each transaction, transaction manager 39 saves only parameters of NID operations, and a state of code object 32. It will be appreciated that the saved information will typically be significantly less than other systems known in the art which initially save parameters of all operations of a transaction. During implementation of the transaction the only management overhead is the change of state of object 32, which is of the order of one bit. Such a management overhead is significantly smaller than the sizes of information stored by transaction management systems known in the art, an example of which (the DO-UNDO-REDO protocol) is referred to in the Background of the Invention.

Flowchart 170 corresponds to complete implementation of transaction 36, when no failure occurs during implementation of the transaction. The following flowchart shows steps taken by transaction manager 39 during a recovery process, i.e., when flowchart 170 is not completely implemented, or when it is not known if the flowchart has been completely implemented.

Figure 12:
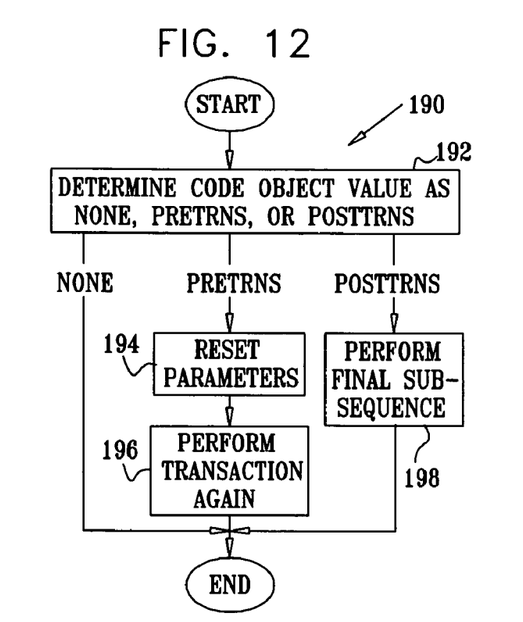
FIG. 12 is a flowchart showing steps performed during a recovery from a malfunction, according to an embodiment of the present invention.

FIG. 12 is a flowchart 190 showing steps performed during a recovery from a malfunction, according to an embodiment of the present invention. Flowchart 190 is typically performed by manager 39 when there has been a malfunction in processing of code 24, after transactions within the code have been optimized as described above. After such a malfunction, flowchart 190 is applied to each transaction of the code. The following description is directed to recovery of transaction 36.

In a first step 192, the value of code object 32 is checked. The object will have one of three values: NONE, PRETRNS, or POSTTRNS.

Code object 32 having a value NONE indicates that all operations of transaction 36 have committed, so no further action regarding transaction 36 is required of the manager, and flowchart 190 ends.

Code object 32 having a value PRETRNS indicates that transaction 36 has been initiated, but that not all operations of initial sub-sequence 40 have committed. In this case, in a step 194, transaction manager 39 uses the saved values of parameters of NID transactions—saved in step 172 of flowchart 170—to reset these parameters. In a step 196, the manager performs transaction 36 again. Alternatively, manager 39 aborts the transaction.

Code object 32 having a value POSTTRNS indicates that all operations of initial sub-sequence 40 have committed, but that not all operations of final sub-sequence 42 have committed. However, since all operations of final sub-sequence 42 are idempotent operations, all the final sub-sequence operations may be performed without causing any inconsistency, regardless of the number of operations of the final sub-sequence that may have already been performed. In a step 198, manager 39 performs all operations in final sub-sequence 42.

After performing step 196 or 198, the recovery process of flowchart 190 ends.

Inspection of the steps comprised in flowchart 190 shows that computational resources required for recovery are of the order of the size of the ID sub-sequence in the transaction.

The description above has been directed to optimizing an initial transaction using a central processing unit (CPU) such as CPU 32 (FIG. 1). It will be understood that in generating code 24, programmer 22 may incorporate at least some of the principles of transaction optimization described above into the code for transactions written by the programmer, such as transaction 26. Such incorporation reduces the amount of computation performed by CPU in optimizing initial sequence 28.

It will be appreciated that the processes described above for optimizing a transaction may be performed in a substantially automatic manner by CPU 32, or at least partially manually by programmer 22, or by a combination of both methods. In an embodiment of the present invention, after a transaction has been at least partially optimized by programmer 22 to form an optimized transaction, the optimized transaction may be further processed by a processing unit such as CPU 32, using the optimization methods described above, to automatically check if further optimization is possible. Typically, the verification informs programmer 22 that more optimization may be possible, or may not be possible. Those skilled in the art will be able to adapt the processes described above, mutatis mutandis, to implement such an automatic check.

Figure 13:
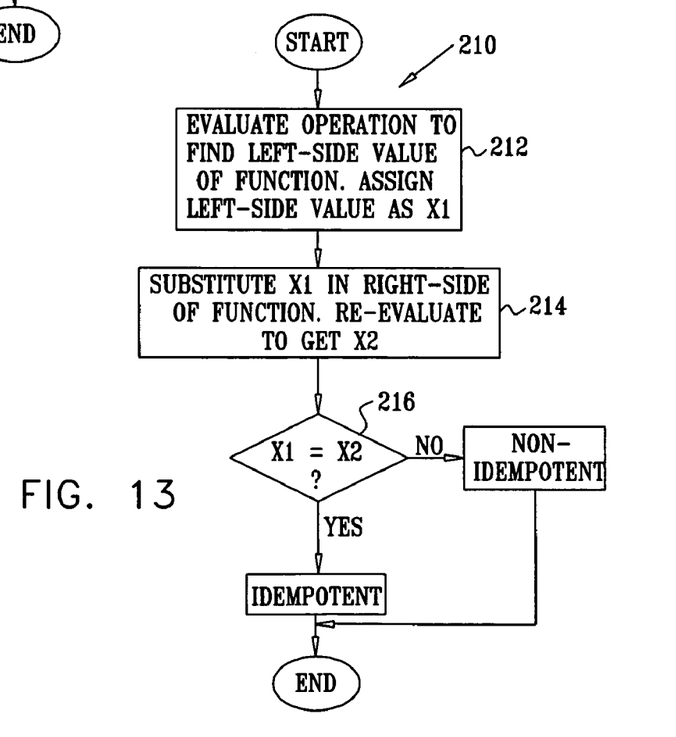
FIG. 13 is a flowchart showing steps performed to evaluate if a computer operation is idempotent during a run-time phase of processing a transaction, according to an embodiment of the present invention.

FIG. 13 is a flowchart 210 showing steps performed to evaluate if a computer operation is idempotent during a run-time phase of processing a transaction, according to an embodiment of the present invention. Flowchart 210 may advantageously be applied to operations which are relatively complicated, possibly comprising many lines of computer code, where the analysis of the operation using the processes described above may take large amounts of computation resources, and/or time. The steps of flowchart 210 are assumed to be incorporated in software 38, and by way of example, the computer operation that is analyzed by the software is assumed to be represented by the equation (2):

$$x = f(x1, x2, \ldots, xn) \qquad (2)$$

where x is a variable and x1, x2, . . . , are arguments of an expression f.

In a first step 212, a value of x of expression f, X1, is determined by software 38.

In a second step 214, the value X1 is substituted for any occurrences of x in the right side of f, i.e., for any arguments of f corresponding to variable x, and the value of x, X2, is determined.

In a check step 216, X1 and X2 are compared. If X1=X2, then the operation under analysis is assumed to be an ID operation. If X1≠X2, the operation under analysis is assumed to be an NID operation.

In an alternative method for evaluating if a computer operation is idempotent during a run-time phase, a transaction comprising the operation is changed to have the operation performed twice. Local results from performing the operation once and then twice are checked, and if the results are the same, the operation being checked is assumed to be an ID operation.

During a run-time phase a pair of operations may also be checked for commutativity, by reversing the order of the operations, and checking the local results of the pair and the reversed pair. If the results are the same, then the pair of operations are assumed to be commutative. It will be understood by those skilled in the art that operations checked during a run-time phase should typically not have side effects.

The steps of flowchart 210, the alternative idempotent evaluation method described above, and/or the check for commutativity described above, may be applied as well as, or as an alternative to, analysis of a graph of the sequence as described above in categorize operation step 56 (FIG. 1). Such run-time phase methods may typically be performed iteratively in combination with categorize operation 56 and/ or optimization step 58. During the iterations, the category column of tables such as Table III will be updated as necessary.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

We claim:

1. A method for optimizing a transaction comprising an initial sequence of computer operations by constructing a computer implemented graph representative of the computer operations, the method comprising:

identifying one or more idempotent operations comprised within the initial sequence; and reordering the initial sequence to form a reordered sequence comprising a first sub-sequence of the computer operations followed by a second sub-sequence of the computer operations, the second sub-sequence comprising only the one or more idempotent operations, wherein each of the computer operations of the initial sequence has a respective sequence number (sn) and comprises a variable (v) equated to a function (k), and wherein identifying the one or more idempotent operations comprises:

defining for the initial sequence graph vertices comprising variable vertices as ordered pairs (sn,v) and function vertices as ordered pairs (sn,k);

constructing directed line segments between the graph vertices in response to predefined rules; and determining that a given directed line segment representative of a given computer operation is not contained in a loop of the directed line segments, so as to identify the given computer operation as idempotent, wherein the predefined rules comprise:

constructing, for each computer operation sn, a directed line segment from each function vertex (sn,k) to its variable vertex (sn,v);

for i<j, constructing a directed line segment from a variable vertex (sn,v) of a sequence number i to a function vertex (sn,k) of a sequence number j, if:

v appears as an argument in function k, and there is no computer operation between sequence i and sequence j for which v is a variable;

for i=j, constructing a directed line segment from the variable vertex (sn,v) to the function vertex (sn,k) if v appears as an argument of k; and constructing, for each pair of computer operations sn, sp, sp>sn, a directed line segment from the variable vertex (sn,v) to the variable vertex (sp,v) if a same variable v is in both operations and variable v does not appear in a computer operation between computer operations sn, sp;

wherein the reordered sequence is an optimized representation of the initial sequence thereby optimizing the transaction in the event of failure.

2. The method according to claim 1, wherein each of the computer operations of the initial sequence has a respective sequence number (sn) and comprises a variable (v) equated to a function (k), and wherein reordering the initial sequence comprises:

defining for the initial sequence graph vertices comprising variable vertices as ordered pairs (sn,v) and function vertices as ordered pairs (sn,k);

constructing directed line segments between the graph vertices in response to predefined rules;

performing a determination that there is no directed line segment connecting first vertices representative of a first computer operation and second vertices representative of a second computer operation consecutive with the first computer operation, so as to identify the first and second computer operations as commutative; and switching an order of the first computer operation and the second computer operation in response to the identification, wherein the predefined rules comprise:

constructing, for each computer operation sn, a directed line segment from each function vertex (sn,k) to its variable vertex (sn,v);

for i<j, constructing a directed line segment from a variable vertex (sn,v) of a sequence number i to a function vertex (sn,k) of a sequence number j, if:

v appears as an argument in function k, and there is no computer operation between sequence i and sequence j for which v is a variable;

for i=j, constructing a directed line segment from the variable vertex (sn,v) to the function vertex (sn,k) if v appears as an argument of k; and constructing, for each pair of computer operations sn, sp, sp>sn, a directed line segment from the variable vertex (sn,v) to the variable vertex (sp,v) if a same variable v is in both operations and variable v does not appear in a computer operation between computer operations sn, sp.

* * * * *

UNITED STATES PATENT AND TRADEMARK OFFICE
CERTIFICATE OF CORRECTION

PATENT NO. : 7,661,099 B2
APPLICATION NO. : 10/879871
DATED : February 9, 2010
INVENTOR(S) : Farchi et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1267 days.

Signed and Sealed this

Thirtieth Day of November, 2010

David J. Kappos
*Director of the United States Patent and Trademark Office*